(12) United States Patent
Owen et al.

(10) Patent No.: US 9,637,307 B2
(45) Date of Patent: May 2, 2017

(54) SLIDING-LOCKING BELOW LIQUID MANWAY DOOR

(71) Applicant: Spokane Industries, Spokane, WA (US)

(72) Inventors: Nathan Hayes Owen, Spokane Valley, WA (US); Michael Phillip Blessing, Coeur d'Alene, ID (US); Thomas Raymond Rodgers, Spokane, WA (US)

(73) Assignee: Spokane Industries, Spokane, WA (US)

( * ) Notice: Subject to any disclaimer, the term of this patent is extended or adjusted under 35 U.S.C. 154(b) by 478 days.

(21) Appl. No.: 14/158,600

(22) Filed: Jan. 17, 2014

(65) Prior Publication Data
US 2015/0203290 A1 Jul. 23, 2015

Related U.S. Application Data

(60) Provisional application No. 61/755,416, filed on Jan. 22, 2013.

(51) Int. Cl.
*B65D 90/58* (2006.01)
*B65D 43/20* (2006.01)
*C12G 1/02* (2006.01)

(52) U.S. Cl.
CPC .......... *B65D 90/587* (2013.01); *B65D 43/20* (2013.01); *C12G 1/02* (2013.01);
(Continued)

(58) Field of Classification Search
CPC ............ B65D 90/587; B65D 2590/666; B65D 2590/664; B65D 2590/542; B65D 90/58;
(Continued)

(56) References Cited

U.S. PATENT DOCUMENTS

| 1,396,448 | A | * | 11/1921 | McGuire | ................ | B60J 5/0402 |
|||||||49/211|
| 1,448,287 | A | * | 3/1923 | Cooper | .................. | B61D 19/00 |
|||||||292/DIG. 32|

(Continued)

FOREIGN PATENT DOCUMENTS

| FR | 2348268 | 11/1977 |
| GB | 2128246 | 4/1984 |

OTHER PUBLICATIONS

Criveller Self Emptying Red Fermenters; page from 2012 Criveller Group product catalog; p. 32; 1 page.

(Continued)

*Primary Examiner* — Robert J Hicks
(74) *Attorney, Agent, or Firm* — Lee & Hayes, PLLC

(57) ABSTRACT

A manway gate assembly couples to a tank and provides a liquid tight seal. The manway gate assembly includes a gate selectively slideable in a first linear direction between an open position, a closed position, and/or an intermediate position between the open position and the closed position. The manway gate assembly includes one or more locking members arranged adjacent to the gate and moveable between a locked position and an un-locked position. When in the locked position, the one or more locking members apply a biasing force to the gate in a second linear direction perpendicular to the first linear direction to seal the gate to the tank and provide a liquid tight seal.

20 Claims, 15 Drawing Sheets

(52) U.S. Cl.
CPC .. *B65D 2590/542* (2013.01); *B65D 2590/664* (2013.01); *B65D 2590/666* (2013.01)

(58) Field of Classification Search
CPC ........ B65D 45/22; B65D 45/16; B65D 43/18; B65D 43/20; B67D 3/0029; B67D 3/0061
USPC .......... 220/326, 345.1–345.6, 262, 565–567, 220/324, 315, 325, 816, 813, 812, 811, 220/823, 820; 49/360, 210, 211, 216; 99/246, 277.1, 277.2; 105/282.2, 282.1, 105/280, 239; 222/185.1
See application file for complete search history.

(56) References Cited

U.S. PATENT DOCUMENTS

| | | | | |
|---|---|---|---|---|
| 1,743,247 A * | 1/1930 | Stark | E05F 11/54 49/360 |
| 1,743,248 A * | 1/1930 | Stark | E05F 11/54 49/360 |
| 1,773,930 A * | 8/1930 | Athon | B08B 9/0933 220/565 |
| 1,774,808 A * | 9/1930 | Morton | E06B 3/44 49/125 |
| 1,840,511 A * | 1/1932 | Kraemer | B63B 19/00 114/177 |
| 1,861,225 A * | 5/1932 | O'Connor | F16J 13/18 220/262 |
| 1,872,976 A * | 8/1932 | Kraemer | B63B 19/00 114/177 |
| 1,908,698 A * | 5/1933 | Edwards | B61D 19/002 49/216 |
| 1,908,929 A * | 5/1933 | Stewart | B61D 19/005 49/211 |
| 1,921,849 A * | 8/1933 | Talen | E05F 15/665 49/360 |
| 1,927,559 A * | 9/1933 | Talen | B66B 13/06 187/317 |
| 1,929,709 A * | 10/1933 | Neely | A01J 9/04 126/343.5 A |
| 1,932,115 A * | 10/1933 | Meadows | E05F 15/643 49/36 |
| 1,972,807 A * | 9/1934 | Waters | E04H 7/065 220/4.17 |
| 2,238,102 A * | 4/1941 | Eisinga | F24H 1/183 220/23.87 |
| 2,313,095 A * | 3/1943 | Schneider | B66B 13/06 220/262 |
| 2,314,970 A * | 3/1943 | Coleman | E05F 11/40 49/210 |
| 2,393,518 A * | 1/1946 | Towers | C12C 11/003 426/16 |
| 2,553,637 A * | 5/1951 | De Camp | B61D 19/009 160/188 |
| 2,570,563 A * | 10/1951 | Kreimendahl | E05D 15/10 16/93 R |
| 2,587,863 A * | 3/1952 | Lambert | B63B 19/00 114/120 |
| 2,652,946 A * | 9/1953 | Beatty | F16K 3/16 220/262 |
| 2,857,074 A * | 10/1958 | Hutterer | D06F 37/28 220/213 |
| 2,869,751 A * | 1/1959 | Klope | B65D 90/06 220/565 |
| 2,979,327 A * | 4/1961 | Swanson | E05F 11/382 49/210 |
| 2,989,304 A * | 6/1961 | Ulmann | E05D 13/06 292/139 |
| 3,298,546 A * | 1/1967 | Jones | F27D 1/1858 110/177 |
| 3,386,203 A * | 6/1968 | Butler | B01J 3/03 220/211 |
| 3,386,206 A | 6/1968 | Loveless | |
| 3,694,960 A * | 10/1972 | Miraldi | E05D 15/00 49/209 |
| 3,802,125 A * | 4/1974 | Baker | B64C 1/1438 49/215 |
| 3,907,250 A * | 9/1975 | Kane | F16K 3/3165 251/147 |
| 3,910,173 A * | 10/1975 | Zepponi | A23N 1/00 222/460 |
| 3,990,184 A * | 11/1976 | Bollinger, Sr. | E05D 15/1002 49/218 |
| 4,015,714 A * | 4/1977 | Silver | B65D 19/08 206/511 |
| 4,343,231 A * | 8/1982 | Devreux | C12M 29/18 426/11 |
| 4,583,655 A * | 4/1986 | Fisher | A47J 27/16 220/316 |
| 4,593,612 A * | 6/1986 | Rieger | B01F 15/068 366/144 |
| 4,612,849 A * | 9/1986 | Konischev | C12G 1/06 426/15 |
| 4,665,807 A * | 5/1987 | Rieger | B01F 5/10 99/277.1 |
| 4,736,868 A * | 4/1988 | Carmon, Jr. | C25D 17/20 220/260 |
| 4,793,243 A * | 12/1988 | Lenz | C12C 7/14 426/16 |
| 4,832,527 A * | 5/1989 | Bachmann | E02B 8/04 405/103 |
| 4,969,391 A * | 11/1990 | Haulot | C12G 1/0216 426/11 |
| 5,547,102 A * | 8/1996 | Rule | B65D 90/10 220/648 |
| 5,570,547 A * | 11/1996 | Webb | B65D 88/08 220/247 |
| 5,586,678 A * | 12/1996 | Rosch | B65D 90/10 220/262 |
| 5,996,831 A * | 12/1999 | Teok | E05B 47/004 220/230 |
| 6,105,805 A * | 8/2000 | Labelle | B60P 3/226 220/262 |
| 6,173,854 B1 * | 1/2001 | Labelle | B60P 3/226 220/262 |
| 6,196,590 B1 * | 3/2001 | Kim | B60P 3/224 220/262 |
| 6,279,457 B1 * | 8/2001 | Francia | C12G 1/0216 99/277 |
| 6,837,147 B2 * | 1/2005 | Daniel | C12G 1/02 29/422 |
| 7,762,281 B2 * | 7/2010 | Schuld | B65D 88/26 137/637 |
| 2001/0042443 A1* | 11/2001 | Francia | C12G 1/0216 99/276 |
| 2001/0042760 A1* | 11/2001 | Krol | C12H 1/22 222/185.1 |
| 2003/0111470 A1* | 6/2003 | Fouillet | B30B 9/22 220/345.1 |
| 2004/0262314 A1* | 12/2004 | Weatherhead | B60P 3/226 220/345.1 |
| 2005/0198902 A1* | 9/2005 | Meyer | B65D 90/587 49/279 |
| 2008/0185385 A1* | 8/2008 | Grampassi | B67D 1/08 220/326 |
| 2009/0145905 A1* | 6/2009 | Kim | B60P 3/226 220/345.1 |
| 2011/0094387 A1* | 4/2011 | Soto Porrua | C12C 11/11 99/276 |
| 2013/0001224 A1* | 1/2013 | Payne | B65D 90/041 220/4.17 |
| 2014/0202337 A1* | 7/2014 | Roleder | C12G 3/065 99/277.1 |

(56) References Cited

U.S. PATENT DOCUMENTS

2014/0326327 A1* 11/2014 Owen ................... B08B 9/0808
  137/15.07
2015/0218499 A1* 8/2015 Frye ...................... C12C 11/006
  99/276

OTHER PUBLICATIONS

PCT Search Report and Written Opinion mailed May 9, 2014 for PCT Application No. PCT/US14/12361, 8 Pages.
Rectangular Manway for Hydraulic / Pneumatic Applications; retrieved from http://www.manways.co.uk/product-detail.asp?prodid=431 on Feb. 11, 2014; 1 page.
JVNW Features; retrieved from http://jvnw.com/images/Literature/Brochures/wine/Wine_Features.pdf on Sep. 22, 2013; 2 pages.
JVNW Manways; retrieved from http://jvnw.com/Components/Manways.html on Sep. 22, 2013; 4 pages.
JVNW Wine Tanks; retrieved from http://jvnw.com/Industries/WineTanks.html on Sep. 22, 2013; 4 pages.
Australian Office Action mailed Jan. 13, 2017 for Australian patent application No. 2014209587, a couerpart foreign application of U.S. Appl. No. 14/158,600, 2 pages.
Partial Supplementary European Search Report mailed Jan. 25, 2017 for European Patent Application No. 14743796.6, 6 pages.

\* cited by examiner

SLIDING-LOCKING BELOW LIQUID MANWAY DOOR

This Application claims priority to U.S. Provisional Patent Application No. 61/755,416, filed Jan. 22, 2013.

BACKGROUND

Below liquid manways (BLMs) exist that are used as access points for tanks or containers. For example, BLMs exist that are used in fermentation and storage tanks as access points to empty and/or clean bottoms of the tanks. These types of BLMs provide liquid-tight seals, and contain head pressures from vertical columns of liquid contained in the tanks.

A typical BLM has a hinged door, swing bolts, and a seal. Because this type of BLM has hinges pivotably fixing the door to the tank, it is difficult to manage a flow rate of product emptying out of the tank. Moreover, the BLM has hinges pivotably fixing the door to the tank, the interface between the BLM and the tank creates interferences (e.g., lips, walls, bridges) across the opening of the BLM. Thus, the BLM impedes the flow of product emptying from the tank and/or builds up (e.g., bridges) product across the opening of the BLM, making the removal and/or cleaning of the product from the bottom of the tank more labor intensive, time consuming, and costly. While, existing BLMs may provide liquid tight seals for containing products in tanks, they are unable to manage flow rates of products emptying out of the tanks, and impede the flow of products emptying from the tanks, which make them more labor intensive, time consuming, and costly.

Sliding gate BLMs also exist that are used as access points for tanks or containers. However, these types of BLMs are not liquid tight and have a short useable life. For example, sliding gate BLMs tend to leak product under pressure. Moreover, because the sliding gate BLM's slide along seals, the sliding gate BLMs aggressively abrade the seals, shortening the useable life of the seals.

Accordingly there remains a need in the art for a BLM that easily opens and closes to manage a flow rate of product emptying out of a tank, does not impede the flow rate of product emptying out the tank, and provides a liquid tight seal under pressure of a vertical column of product contained in the tank.

SUMMARY

This summary is provided to introduce simplified concepts of a manway gate assembly and method, which is further described below in the Detailed Description. This summary is not intended to identify essential features of the claimed subject matter, nor is it intended for use in determining the scope of the claimed subject matter.

In one example, a container comprising a tank for holding a product may include a manway gate assembly coupled to the tank. The manway gate assembly may comprise a gate slideably disposed in a first plane adjacent to a surface of the tank. The gate may be slideably displaced in the first plane along the surface of the tank between an open position, a closed position, and/or an intermediate position between the open position and the closed position.

In another example, the manway gate assembly may include one or more locking members having a longitudinal axis movably disposed in a second plane parallel to the first plane. In one example, the one or more locking members may slide in the second plane parallel to the first plane. In another example, the one or more locking members may rotate in the second plane parallel to the first plane. The one or more locking members may be displaced between a locked position and an un-locked position. The one or more locking members may apply a locking force to the gate in a direction perpendicular to the first and second planes to seal the gate to the surface of the tank in the locked position.

In another example, the manway gate assembly may be coupled to a tank. The tank may have a non-zero slope relative to a horizontal support surface (e.g., a sloped bottom surface) opposite a top surface, a wall fixed between the bottom and top surfaces, and an aperture arranged in the wall of the tank. The aperture may be arranged in the wall of the tank proximate to the lowest portion of the slope of the bottom surface of the tank. The aperture may comprise a sealing surface to seal with the gate of the manway gate assembly. In one example, the gate may include one or more locking members slideably arranged adjacent to the gate. In another example, the gate may include one or more locking members rotatably arranged adjacent to the gate.

In another example, a manway sliding gate assembly for coupling with a container and arranged to empty a liquid product held in the container may include a gate and one or more locking members. The gate may selectively slide in a first linear direction between an open position, a closed position, and/or an intermediate position between the open position and the closed position. In one example, the one or more locking members may be movably arranged adjacent to an outer perimeter of the gate.

Depending on the desired esthetic and mechanical properties of the manway gate assembly and/or the tank, and a substance that the tank is intended to hold, components may comprise metal, plastic, and/or ceramic. For example, in some embodiments, the manway gate assembly and/or the tank may comprise steel (e.g., stainless steel), copper, and/or aluminum.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
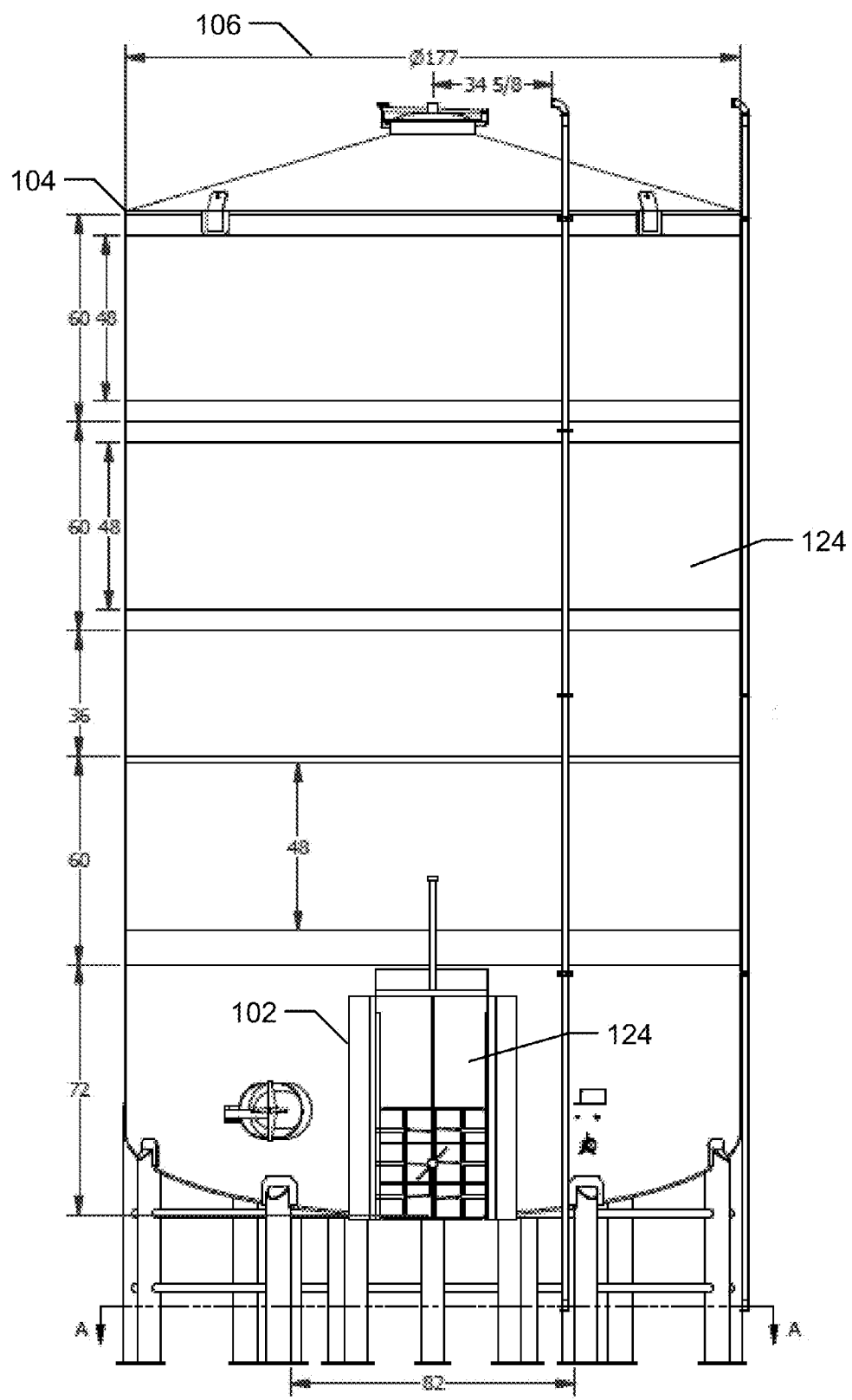
FIG. 1A illustrates a front view of an example manway gate assembly coupled to a tank.

This disclosure is directed to manway gate assemblies for containing products in tanks that are liquid tight under pressure of vertical columns of products in the tanks. A manway gate assembly according to one example embodiment may include a gate slideable between an open position, a closed position, and/or an intermediate position between the open position and the closed position. Such an example manway gate provides control to manage a flow rate of product emptying out of the tank, without abrading a seal between the slideable gate and the tank. For example, a user may simply activate an actuator connected to the gate to slideably displace the gate between the open position, the closed position, and/or the intermediate position between the open position and the closed position along a surface of the tank, but without the gate coming in contact with or abrading the seal between the gate and the tank. Stated otherwise, the gate is spaced from and avoids contact with the seal surface during the linear displacement of the gate, thus eliminating any abrasion of the seal between the gate and the tank. In one example, the closed position of the gate may be when a bottom edge of the gate engages with a receiver. In another example, the closed position of the gate may be when a bottom edge of the gate engages with one or more pads or stops. In another example, the closed position of the gate may be when the gate is in contact with the seal surface.

The manway gate assembly may include one or more locking members arranged adjacent to the gate. For example, the manway gate assembly may include one or more pins or bolts arranged adjacent to the gate. Further, the one or more pins or bolts may be arranged adjacent to an exterior surface of the gate. As another example, the one or more pins or bolts may be arranged adjacent to a surface of the tank. For example, the one or more pins or bolts may be arranged adjacent to an exterior surface of the tank. The one or more locking members may be slideably displaced between a locked position and an un-locked position, which will in turn apply a biasing force to the gate in a direction perpendicular to a sealing surface of the tank to seal the gate to the sealing surface in the locked position. For example, the gate may selectively slide in a first linear direction, between an open position, a closed position, and/or an intermediate position between the open position and the closed position. Then, moving the one or more pins slideably arranged adjacent to the gate may displace the gate in a second linear direction perpendicular to the first linear direction and may seal the gate to the sealing surface of the tank. When in the locked position the one or more pins lock or fix the gate in the sealed position such that the gate cannot inadvertently be opened or moved. In another example, the manway gate assembly may include one or more locking members (e.g., pins or bolts) rotatably arranged adjacent to the gate. Additional details regarding this particular manway gate assembly are provided below in the discussion of FIG. 8 through FIG. 14.

In some examples, the manway gate assembly may include a frame arranged around the gate. The frame may comprise one or more apertures arranged in the frame. In one example, the one or more apertures may removeably receive the one or more locking members. For example, the one or more apertures arranged in the frame may cooperate with one or more pins to displace the gate in the second linear direction perpendicular to the first linear direction to seal the gate to the seal surface of the tank. For example, the one or more apertures may cooperatively receive tapered ends of the one or more pins to apply a biasing force to the gate in the second linear direction. For example, when the one or more pins are in the locked position (e.g., fully engaged with the one or more apertures), the one or more tapered pins tightly press the gate door against an elastomeric seal thus creating a liquid tight seal capable of not leaking under pressure (e.g., up to at least about 17 psi). In another example, the one or more apertures arranged in the frame may slideably receive the one or more locking members to guide the gate in the first linear direction.

In some embodiments, the manway gate assembly may include a cam coupled to the gate and connected to the one or more locking members. In one example, the cam may be connected to one or more locking members to slideably displace the one or more locking members between the locked position and the un-locked position. For example, the gate may include a manual cam (e.g., camlock) that when manually rotated by a user slideably displaces the one or more locking members between the locked position and the un-locked position. Moreover, the gate may include an actuator coupled to the cam that when actuated (e.g., energized) by a user, slideably displaces the one or more pins between the locked position and the un-locked position. In another example, the cam may be connected to one or more pins to rotate the one or more pins between the locked position and the un-locked position. For example, the gate may include an actuator coupled to a cam that when actuated (e.g., energized) by a user rotating the one or more pins between the locked position and the un-locked position. Further, the gate may include more than one cam and/or eccentric to displace the one or more locking members between the locked position and the un-locked position.

Illustrative Manway Gate Assembly

FIG. 1A illustrates a front view of an example manway gate assembly 102 coupled to a tank 104. In one example, the tank 104 may be a fermentation tank. For example, the tank 104 may be a wine fermenter for holding a juice. The tank 104 may be a self-emptying or self-cleaning tank. For example, once the fermentation process has been completed, and the wine (juice) removed, the pomace remains in the bottom of the tank (e.g., tank 104). The pomace consists of grape skins, seeds, and spent yeast. This must be removed from the tank where it will be subsequently pressed of any remaining juice and disposed of Typically the pomace is removed manually with rakes and shovels, requiring considerable time and manpower. For example, cleaning a tank may take several workers several hours. Moreover, some of the workers would have to enter the tank and be exposed to a potential health hazard from carbon dioxide (as a by-product from fermentation) poisoning. Self-emptying tanks are sometimes used and are faster and less labor intensive to empty the pomace from the self-emptying tanks. The tank 104 may have a volume of about 30,000 gallons and ferment about 100 tons of grapes. However, in other embodiments larger or smaller tanks may be used. In the illustrated example, the tank 104 has an outside diameter 106 of about 177 inches. The tank 104 may take less than an hour (e.g., about 45 minutes) to self-empty the pomace from tank 104, and not require a single worker to enter the tank 104.

Figure 1B:
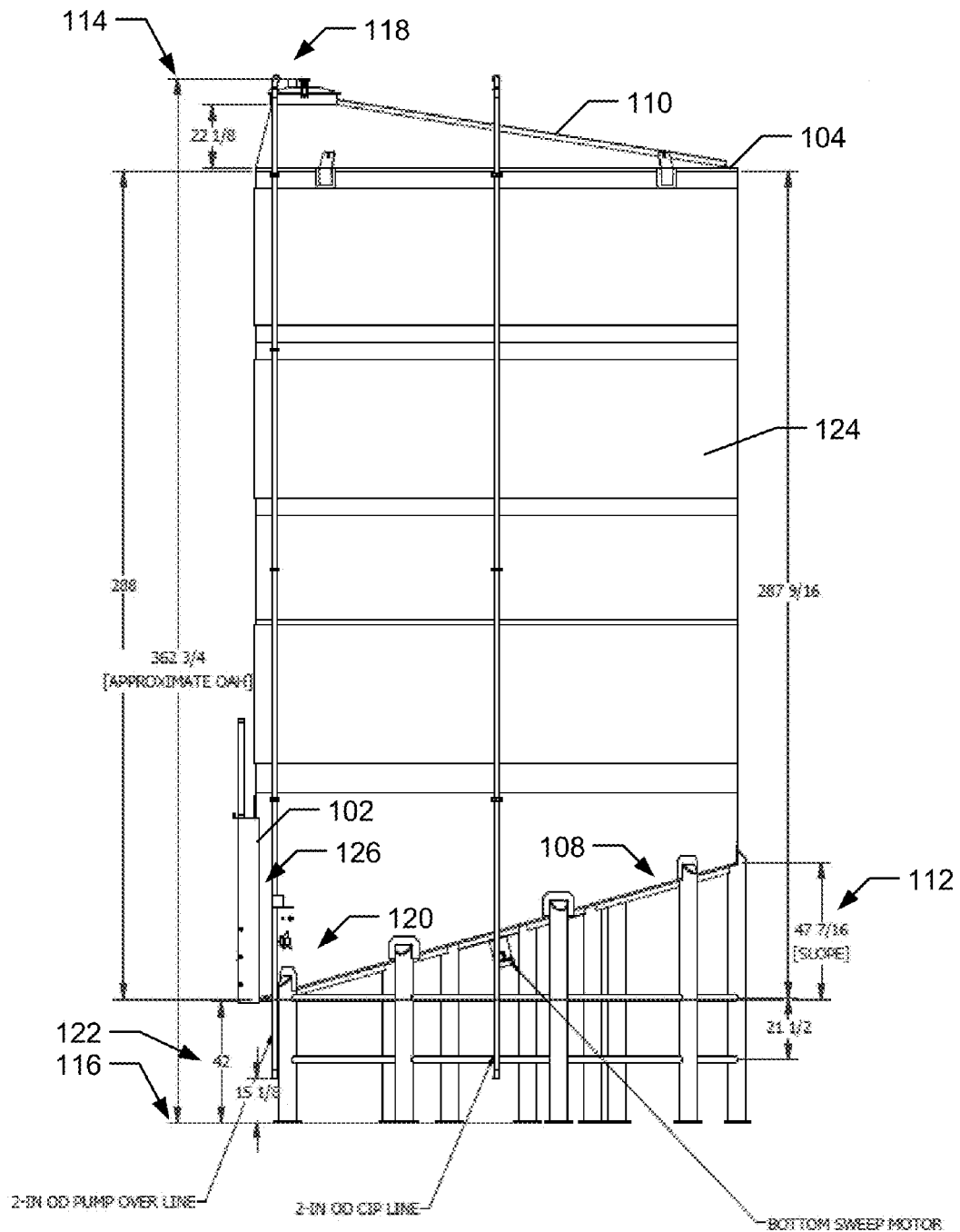
FIG. 1B illustrates a side view of the example manway gate assembly and tank shown in FIG. 1A.

FIG. 1B illustrates a side view of the example manway gate assembly 102 and tank 104 shown in FIG. 1. FIG. 1B illustrates the tank 104 includes a bottom surface 108 opposite a top surface 110. The bottom surface 108 may have a non-zero slope 112 relative to a horizontal support surface (e.g., surface of ground). For example, the bottom surface 108 may have a slope to provide for the pomace having somewhat the consistency of jam to slide out easily. In most examples, the slope of the bottom surface 108 may be at least about a 0.1 inch rise to a 12 inch run, up to at most about a 2 inch rise to a 12 inch run. However, in some instances, slopes above or below this range may also be used.

FIG. 1B illustrates a tank having a height 114 of about 362 inches from surface of ground 116 to a top 118 of the tank 104. The lowest portion 120 of the slope 112 of the bottom surface 108 of the tank 104 may be arranged a distance 122 above the ground 116. For example, the lowest portion 120 of the slope 112 of the bottom surface 108 of the tank 104 may be arranged about 42 inches above the ground 116 to provide for placing a receptacle (e.g., box, container, bin) under the manway gate assembly 102. While the tank and manway gated assemblies are described having certain shapes, sizes, and configurations they are simply specific illustrated embodiments and other dimensions are possible. For example, a tank may range from about a 300 gallon tank up to about a 42,000 gallon tank. In another example, a tank may have a height of about 50 inches up to about 480 inches.

The manway gate assembly 102 may be coupled to the tank 104 proximate to the lowest portion 120 of the slope 112 of the bottom surface 108 of the tank 104 configured to provide for controlling the flow rate of product (e.g., pomace) emptying from the tank 104 to the receptacle. FIGS. 1A and 1B illustrates a wall 124 fixed between the bottom surface 108 and the top surface 110. An aperture may be arranged in the wall 124 of the tank 104 proximate to the lowest portion 120 of the slope 112 of the bottom surface 108 of the tank 104. The aperture may comprise a sealing surface arranged around a perimeter of the aperture. A neck 126 may be arranged around the aperture and coupled to the wall 124 of the tank 104 proximate to the lowest portion 120 of the slope 112 of the bottom surface 108 of the tank 104. The neck 126 may comprise a sealing surface arranged distal to an outside surface of the wall 124 of the tank 104. FIGS. 1A and 1B illustrate the manway gate assembly 102 arranged around the neck 126 configured to empty the product held in the tank 104. Depending on the size of a tank, the manway gate assembly 102 may be required to provide a liquid tight seal against a head pressure of about 17 psi.

Figure 2:
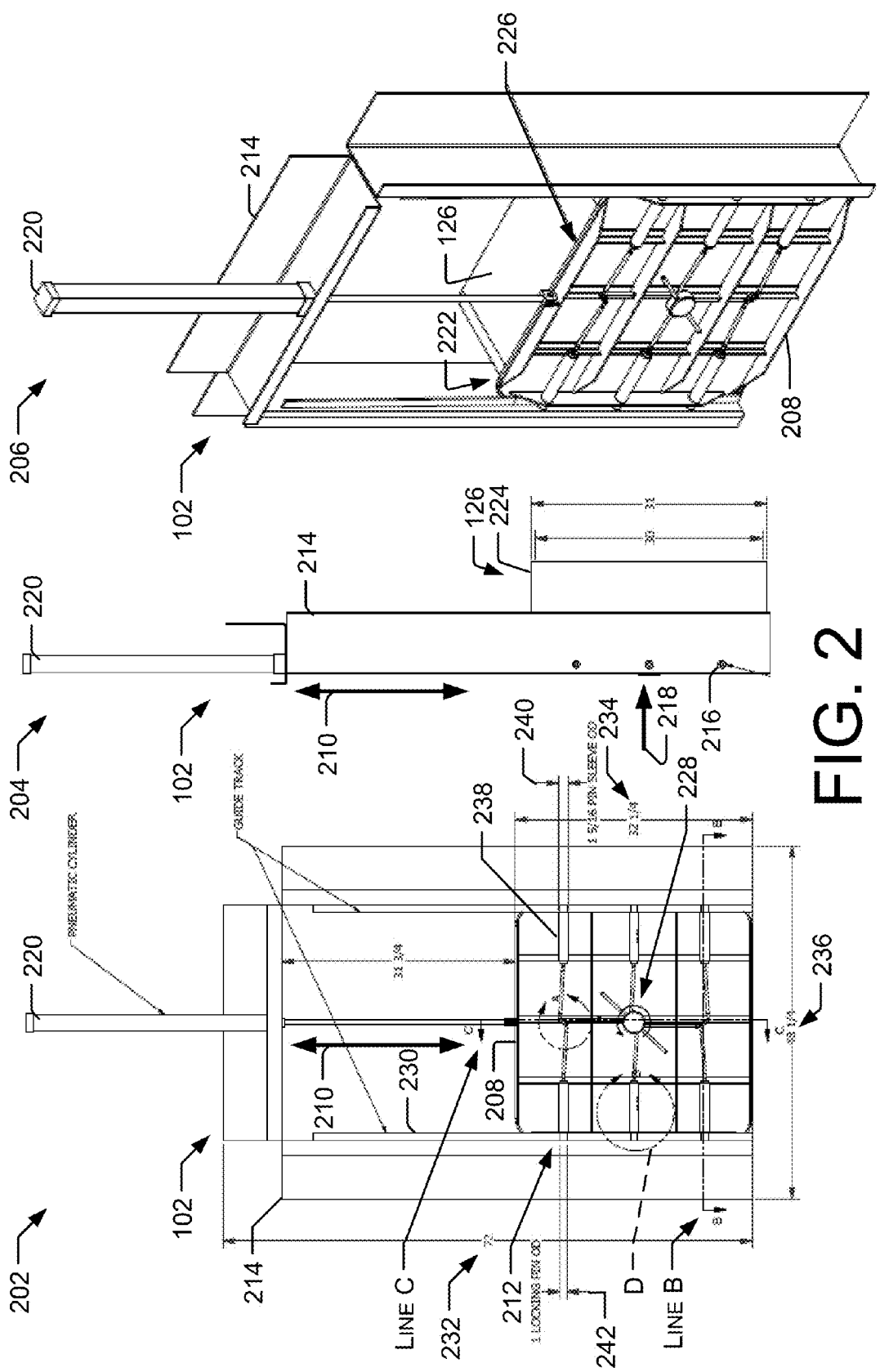
FIG. 2 illustrates a front view, side view, and perspective view of the example manway gate assembly shown in FIGS. 1 and 2.

FIG. 2 illustrates a front view 202, side view 204, and perspective view 206 of the example manway gate assembly 102 shown in FIGS. 1 and 2 with the tank omitted for clarity. Front view 202 illustrates the manway gate assembly 102 comprising a gate 208 configured to selectively slide in a first linear direction 210 between an open position, a closed position, and/or an intermediate position between the open position and the closed position. In one example, the gate 208 may comprise a substantially planar rectangular shaped plate. In another example, the gate 208 may comprise a curvilinear rectangular shaped plate to match a radius of the tank. One or more locking members 212 may be slideably arranged adjacent to the gate 208. The one or more locking members 212 may be configured to slideably displace between a locked position and an un-locked position. The one or more locking members 212 apply a biasing force to the gate in a direction perpendicular the first linear direction 210 in the locked position. The one or more locking members 212 may be pins, rods, bolts, bars etc.

Front view 202 illustrates a frame 214 arranged around the gate 208. Side view 204 illustrates the frame 214 comprising one or more apertures 216 arranged in the frame 214 configured to removeably receive the one or more locking members 212. Side view 204 illustrates the one or more apertures 216 may cooperate with the one or more locking members 212 configured to displace the gate in a second linear direction 218 perpendicular to the first linear direction 210. For example, the one or more apertures 216 may cooperatively receive tapered ends of the one or more locking members 212 to displace the gate 208 in the second linear direction 218 to tightly press the gate 208 against a gasket (e.g., an elastomeric seal) thus creating a liquid tight seal.

Front view 202 illustrates an actuator 220 (e.g., a pneumatic cylinder, a hydraulic cylinder, an electric motor with a linear gear, etc.) coupled to the frame 214 and connected to the gate 208. The actuator 220 is configured to selectively slide the gate 208 along a sealing surface 222 of the neck 126 between the open position, the closed position, and/or an intermediate position between the open position and the closed position. The neck 126 may comprise a wall 224 fixed perpendicular to the surface of the tank 104. As discussed above with regard to FIGS. 1A and 1B, the neck 126 may be coupled to the wall 124 of the tank 104 proximate to the lowest portion 120 of the slope 112 of the bottom surface 108 of the tank 104, and the sealing surface 222 may be arranged distal to an outside surface of the wall 124 of the tank 104. For example the wall 224 of the neck 126 may be fixed to the wall 124 of the tank 104 proximate to the lowest portion 120 of the slope 112 of the bottom surface 108 of the tank 104. The wall 224 of the neck 126 may have an outer edge (e.g., sealing surface 222) arranged around a perimeter of the wall 224 of the neck 126 and distal to the surface of the tank 104. The one or more locking members 212 may apply a biasing force to the gate 208 in the second linear direction 218 perpendicular to the sealing surface 222 to seal the gate to the sealing surface 222 of the neck 126 in the locked position.

The gate 208 may be arranged to selectively slide parallel to the sealing surface 222 of the neck 126 between the open position, the closed position, and/or an intermediate position between the open position and the closed position. The gate 208 may be slideably disposed in a first plane adjacent to a surface (e.g., wall 124) of the tank 104, and the gate 208 may slideably displace in the first plane along the surface of the tank 104 between an open position, a closed position, and/or an intermediate position between the open position and the closed position. The gate 208 may comprise a gasket 226 coupled to the gate 208 to seal the gate 208 to the sealing surface 222 of the neck 126 in the locked position. The gasket 226 may cover substantially the entire rear face of the gate 208 or only a portion of the rear face of the gate 208. The gasket 226 may comprise a plastic gasket, a rubber gasket, a paper gasket, metal gasket, a cork gasket, etc. Depending on the material and intended use, gaskets may be elastomeric, flexible, semi-rigid, etc.

Front view 202 illustrates a cam 228 connected to the one or more locking members 212 to slideably displace the one or more locking members 212 between the locked position and the un-locked position. While front view 202 illustrates the cam 228 coupled to the gate 208 and connected to the one or more locking members 212 to slideably displace the one or more locking members between the locked position and the un-locked position, the cam 228 may be coupled to the wall 124 of the tank 104. Further, while front view 202 illustrates a single cam 228 coupled to the gate 208, the gate 208 may include more than one cam to slideably displace the one or more locking members between the locked position and the un-locked position. Moreover, the gate 208 may not include a cam coupled to the gate 208. For example, the actuator may be coupled to the one or more locking members 212 and the gate 208 and provide for selectively sliding the gate 208 between the open position, the closed position, and/or the intermediate position between the open position and the closed position, and slideably displace the one or more locking members between the locked position and the un-locked position. While front view 202 illustrates a manually operated cam 228, the manway gate assembly 102 may comprises an actuator connected with the cam 228. For example, a linear actuator may be coupled to the cam 228 and operate the cam 228 to slideably displace the one or more locking members between the locked position and the un-locked position.

Front view 202 illustrates the manway gate assembly 102 may comprise one or more guide tracks 230 configured to guide the gate 208 in the first linear direction 210. Front view 202 illustrates the frame 214 has a height 232 of about 72 inches and the gate 208 has a height 234 of about 32 inches. The frame 214 may have a width 236 of about 48 inches. One or more sleeves 238 may be coupled to the gate 208 to slideably receive the one or more locking members 212. The one or more sleeves 238 may have an outside diameter 240 of about 1.3 inches and the one or more locking members 212 have an outside diameter 242 of about 1 inch.

Figure 3:
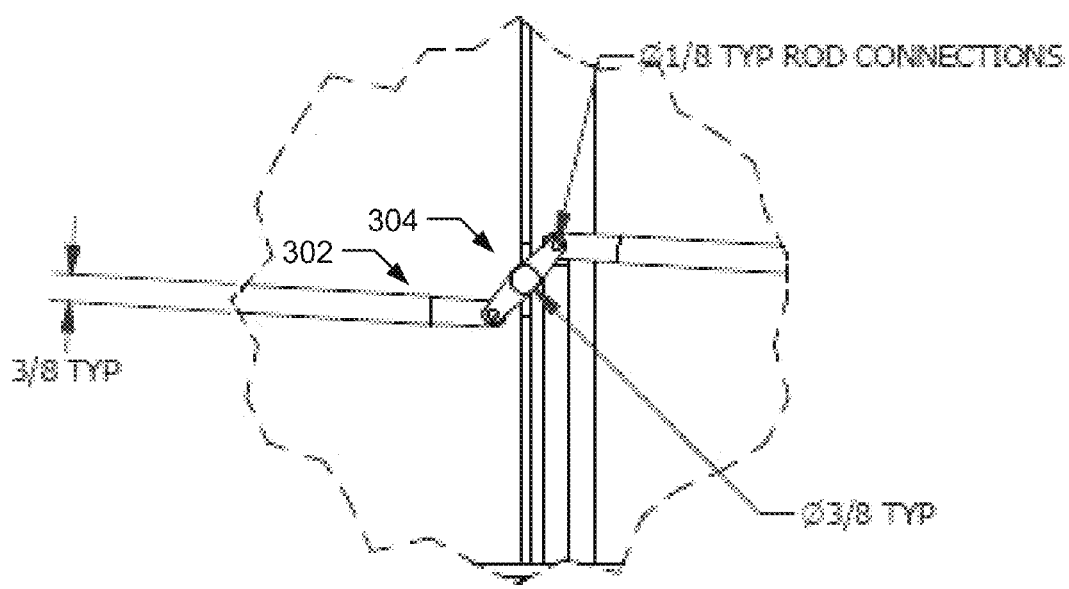
FIG. 3 illustrates a detail view of a rod connection of the example manway gate assembly shown in the front view of FIG. 2 taken at location A.

FIG. 3 illustrates a detail view of a typical rod connection of the example manway gate assembly 102 shown in the front view 202 of FIG. 2 taken at location A. FIG. 3 illustrates one or more rods 302 connected to one or more cams 304. The one or more cams 304 may be connected to the one or more locking members 212. The one or more cams 304 may be connected to the cam 228. Thus, when the cam 228 is displaced (e.g., rotated), the cam 228 displaces the one or more cams 304, and the one or more rods 302 slideably displace the one or more locking members 212.

Figure 4:
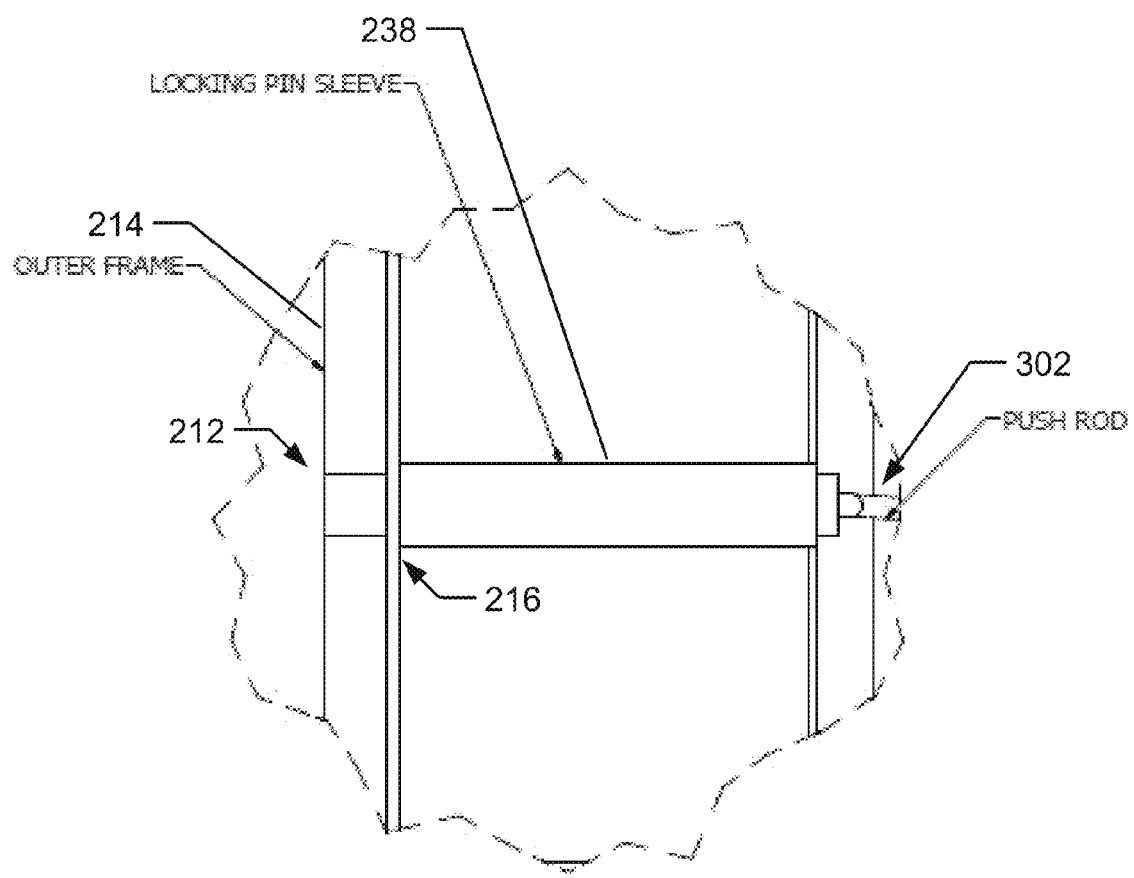
FIG. 4 illustrates a detail view of a locking member of the example manway gate assembly shown in the front view of FIG. 2 taken at location D.

FIG. 4 illustrates a detail view of a sleeve of the one or more sleeves 238 coupled to the gate 208 of the example manway gate assembly 102 shown in the front view 202 of FIG. 2 taken at location D. FIG. 4 illustrates a pin of the one or more locking members 212 slideably received by the sleeve and in the locked position. For example, FIG. 4 illustrates the tapered pin in the locked position (e.g., fully engaged with the one of the one or more apertures 216). The pin is shown connected to one of the one or more push rods 302.

Figure 5:
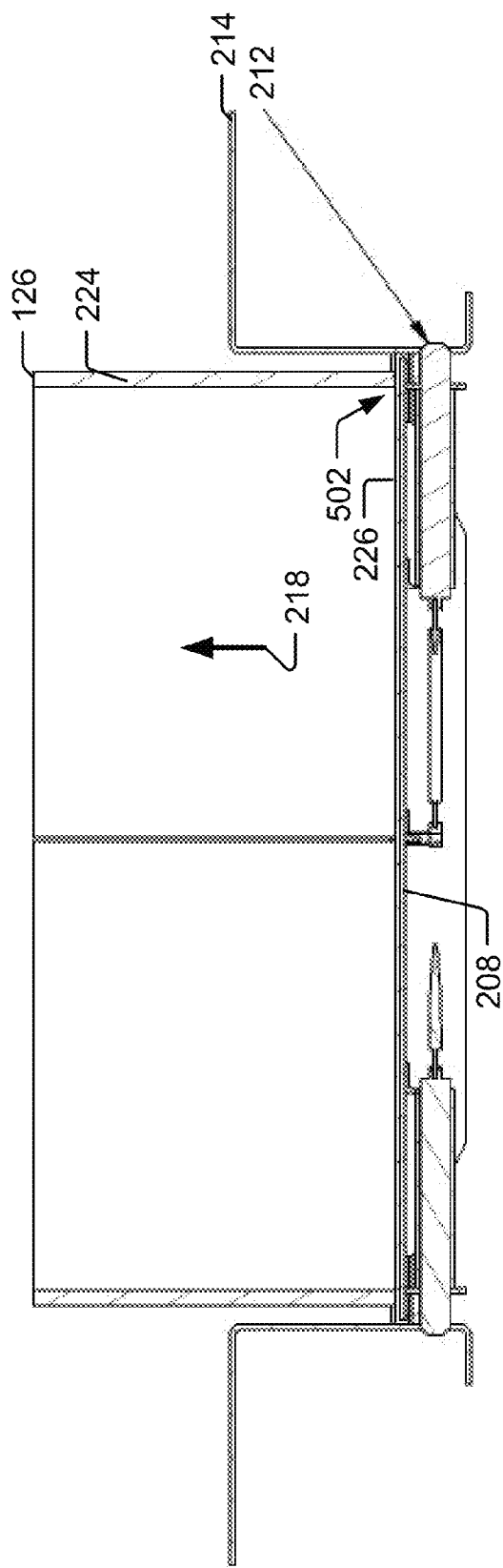
FIG. 5 illustrates a detail section view of the example manway gate assembly shown in the front view of FIG. 2 taken along line B-B.

FIG. 5 illustrates a detail section view of the example manway gate assembly 102 shown in the front view 202 of FIG. 2 taken along line B-B. FIG. 5 illustrates the wall 224 of the neck 126 may have an outer edge 502 arranged around a perimeter of the wall 224 of the neck 126 and distal to the surface of the tank 104. As discussed above, the outer edge 502 may provide for a sealing surface (e.g., sealing surface 222) configured to seal the gate 208 to the tank 104. For example, and as discussed above with regard to FIG. 2, the gate 208 may include the gasket 226 covering substantially the entire rear face of the gate 208 or only a portion of the rear face of the gate 208. Moreover, the tapered ends of the one or more locking members 212 may apply a biasing force to the gate 208 in the second linear direction 218 to tightly press (e.g., squeeze, pinch, squish, deform, etc.) the gasket 226 between the gate 208 and the outer edge 502 of the neck 126, thus creating a liquid tight seal. While FIG. 5 illustrates the one or more locking members 212 displacing the gate 208 in the second linear direction 218 to tightly press (e.g., squeeze, pinch, squish, deform, etc.) the gasket 226 to create a liquid tight seal capable not leaking under pressure of about 17 psi, the one or more locking members 212 may create a liquid tight seal capable not leaking under pressure of more than 17 psi. For example, the manway gate assembly 102 may include more and/or larger pins configured to provide a greater compression force to create a liquid tight seal capable not leaking under pressure of more than about 25, 50, 75, or 100 psi.

Figure 6:
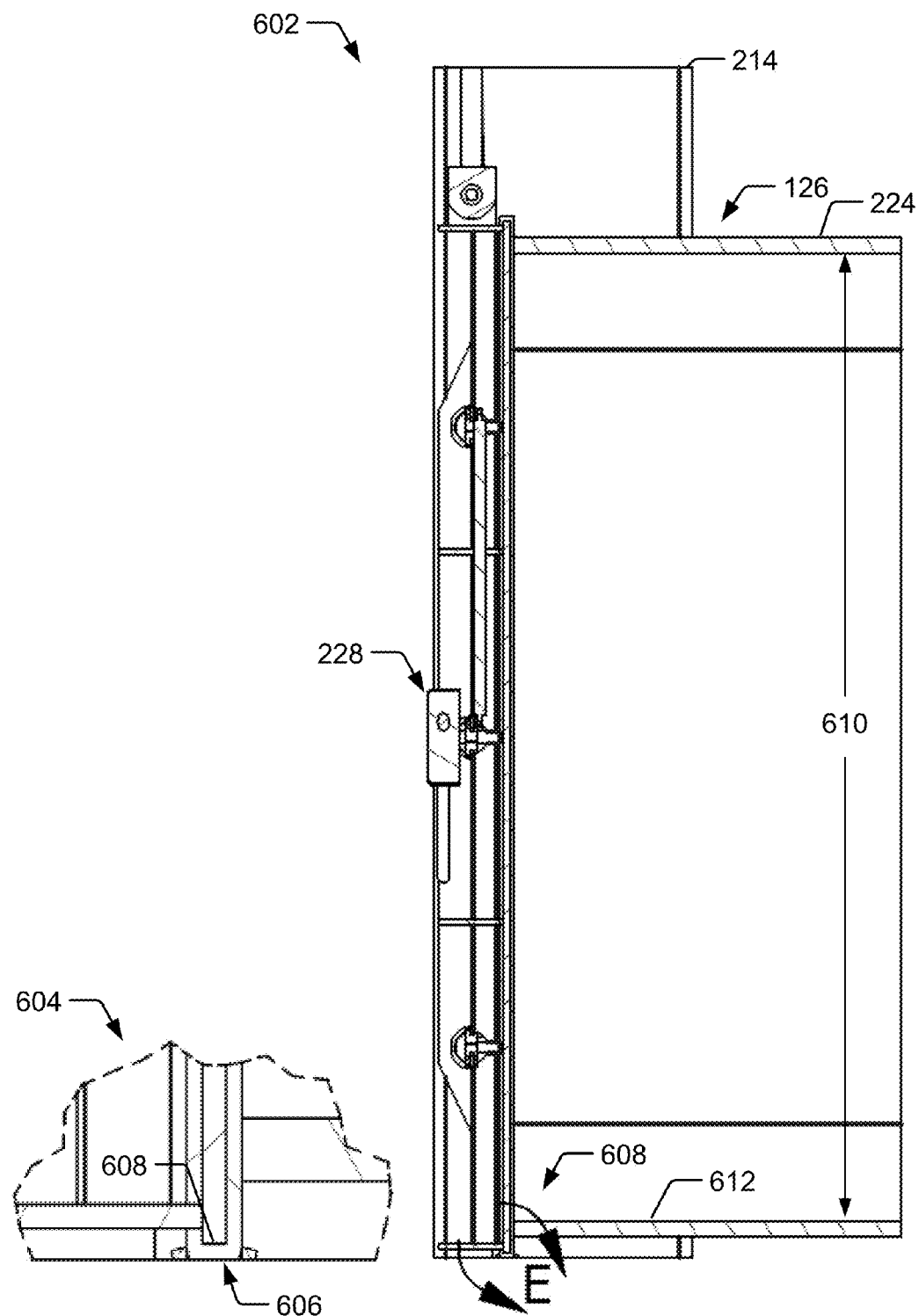
FIG. 6 illustrates a detail section view of the example manway gate assembly shown in the front view of FIG. 2 taken along line C-C, and a detail view of a receiver cooperating with a bottom edge of a gate shown in the detail section view of FIG. 6 taken at location E.
Figure 7:
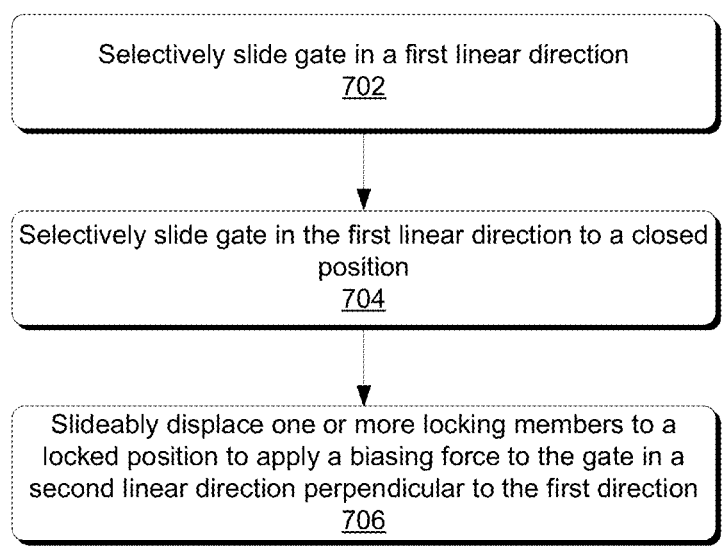
FIG. 7 is a flow diagram illustrating an example process of closing and locking a tank via the example manway gate assembly shown in FIGS. 1 and 2.

FIG. 6 illustrates a detail section view 602 of the example manway gate assembly 102 shown in the front view of FIG. 2 taken along line C-C, and a detail view 604 of a receiver 606 cooperating with a bottom edge 608 of the gate 208 shown in the detail section view 602 of FIG. 7 taken at location E. Detail section view 602 illustrates a passageway 610 having a substantially uniform planar surface 612 that provides for not impeding the flow of product emptying from the tank 104. For example, the substantially uniform planar surface 612 of the passageway 610 doesn't build up product across an opening of the manway gate assembly 102. The detail view 604 illustrates the bottom edge 608 of the gate 208 securely seats in the receiver 606 and also provides for not impeding the flow of product emptying from the tank 104.

Example Method of Using a Manway Gate Assembly

FIG. 7 illustrates an example method 700 of closing and locking a tank (e.g., tank 104) via an example manway gate assembly (e.g., manway gate assembly 102). For instance, this process may be performed to empty and/or clean a self-emptying or self-cleaning tank, which has a bottom surface (e.g., bottom surface 108) having a slope (e.g., slope 112), which provides for a more efficient removal of pomace in the bottom of the tank. While FIG. 7 illustrates a method of using an example manway gate assembly configured to provide a liquid tight seal for a fermentation tank, this method may apply to using the manway gate assembly with any type of container. For example, the manway gate assembly may be used with a mash tank, a petroleum tank, a milk tank, a septic tank, a gas tank, etc.

Method 700 may include an operation 702, which represents selectively sliding a gate (e.g., gate 208) in a first linear direction (e.g., first linear direction 210). For example, a user may selectively slide the gate in the first linear direction between an open position, a closed position, and/or an intermediate position between the open position and the closed position. A user may selectively slide the gate in the first linear direction between an open position, a closed position, and/or an intermediate position between the open position and the closed position to control a flow rate of product (e.g., pomace) emptying from the tank. The gate may be selectively moved between the open, closed, and/or an intermediate positions via an actuator (e.g., actuator 220). Method 700 may proceed to operation 704, which represents selectively sliding the gate in the first linear direction to the closed position. For example, subsequent to emptying and/or cleaning the product from the tank, a user may selectively close the gate to the closed position. For example, a user may selectively close the gate such that a receiver (e.g., receiver 606) cooperatively receives a bottom edge (e.g., bottom edge 608) of the gate.

Method 700 may be complete at operation 706, which represents slideably displacing one or more locking members (e.g., one or more locking members 212) to a locked position, where the one or more locking members apply a biasing force to the gate in a second linear direction 218 perpendicular to the first linear direction.

Figure 8:
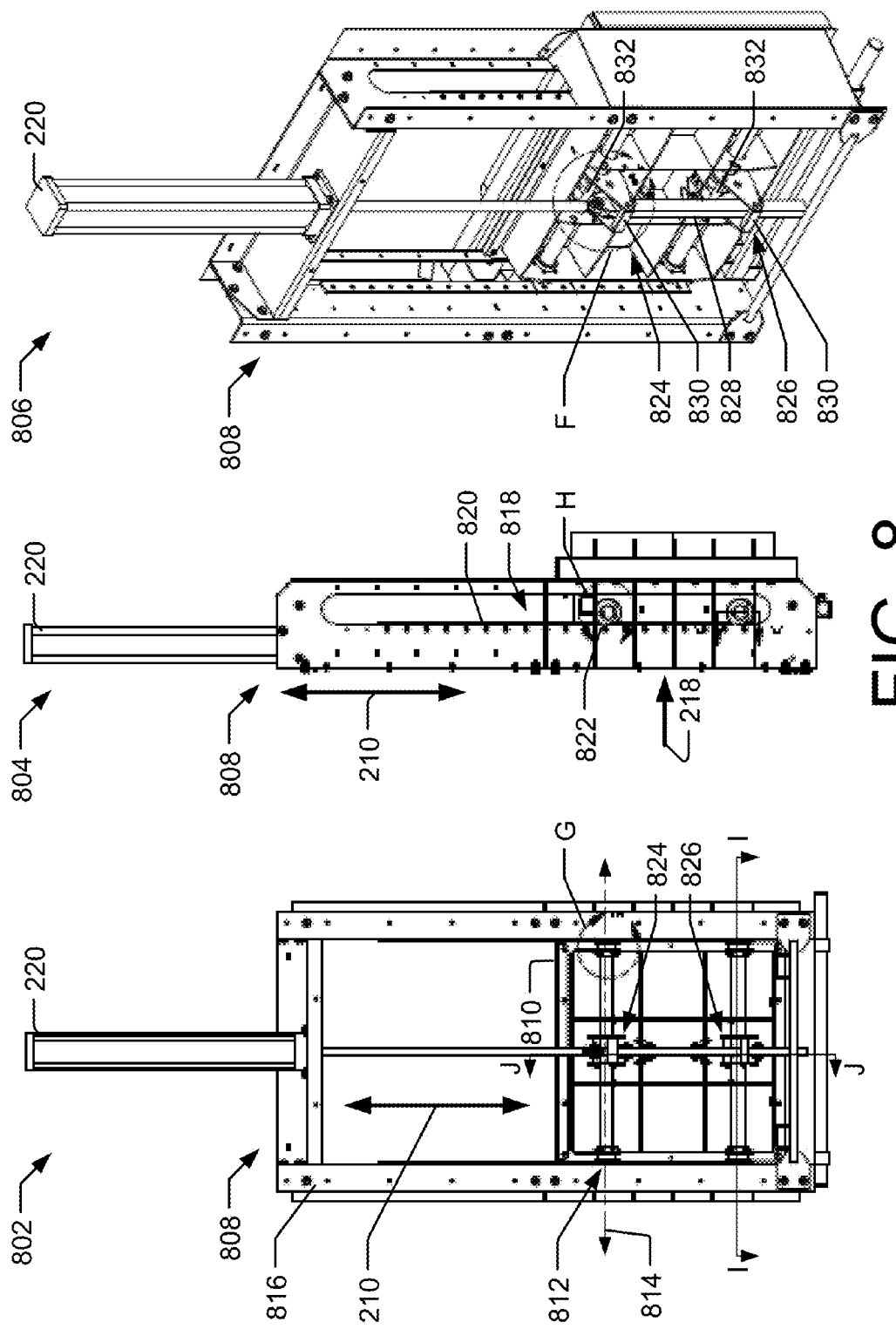
FIG. 8 illustrates a front view, side view, and perspective view of another example manway gate assembly.

FIG. 8 illustrates a front view 802, a side view 804, and a perspective view 806 of another example manway gate assembly 808. The front view 802, side view 804, and perspective view 806 show the manway gate assembly 808 apart from a wall of a tank for clarity. Front view 802 illustrates the manway gate assembly 808 comprising a gate 810 to selectively slide in the first linear direction 210 between an open position, a closed position, and/or an intermediate position between the open position and the closed position. In one example, the gate 810 may comprise a substantially planar rectangular shaped plate. In another example, the gate 810 may comprise a curvilinear rectangular shaped plate to match a radius of the tank. The manway gate assembly 808 may include one or more locking members 812 having a longitudinal axis 814 that rotate in the second plane parallel to the first plane. For example, the one or more locking members 812 may be rotatably disposed adjacent to the gate 810, each of the one or more rotatable locking members 812 configured to rotate about the longitudinal axis 814 of each of the one or more rotatable locking members 812 between the locked position and the un-locked position. The one or more locking members 812 may apply a biasing force to the gate 810 in a direction perpendicular to the sealing surface of the aperture to seal the gate to the sealing surface of the neck in the locked position.

Front view 802 illustrates a frame 816 arranged around the gate 810. Side view 804 illustrates that the frame 816 comprises one or more apertures 818 arranged in the frame 816 to slideably receive the one or more locking members 812 to guide the gate in the first linear direction 210 along the frame 816. Side view 804 illustrates one or more apertures 818 arranged along the frame 816, which may cooperate with the one or more locking members 812 to displace the gate in the second linear direction 218 perpendicular to the first linear direction 210. For example, the one or more apertures 818 arranged in the frame 816 may comprise one or more bearing surfaces 820, and the one or more locking members 812 may comprise one or more cams 822 to bear on the one or more bearing surfaces 820 to displace the gate 810 perpendicular to the first and second planes to seal the gate 810 to a surface of a tank. For example, the one or more locking members may rotate the one or more cams 822 (e.g., round projection, protrusion, bump, lobe, etc.) in a direction towards the bearing surfaces 820 such that the one or more cams 822 bear on the bearing surfaces 820 and apply a biasing force to the gate 810 in the second linear direction 218 to tightly press the gate 810 against the gasket 226 thus creating a liquid tight seal. Further, the one or more locking members may rotate the one or more cams 822 in a direction towards the bearing surfaces 820 to the locked position. Similarly, the one or more locking members 812 may rotate the one or more cams 822 in a direction away from the bearing surfaces 820 to the un-locked position. The one or more cams 822 may be coupled to the ends of the locking members 812. For example, the one or more cams 822 may comprise a collar or eccentric member mechanically fastened to the ends of a shaft, a pin, a bolt, a rod, or the like. Alternatively, one or more of the cams 822 may be formed integrally with the ends of the one or more locking members.

Front view 802 illustrates the actuator 220 coupled to the frame 816 and connected to the gate 810. As discussed above, the actuator 220 may be configured to selectively slide the gate 810 along a sealing surface 222 of an aperture arranged in the wall of the tank proximate to the lowest portion of the slope of the bottom surface of the tank. For example, the actuator 220 may be configured to selectively slide the gate 810 along a sealing surface 222 of an aperture arranged in the wall of the tank between the open position, the closed position, and/or the intermediate position between the open position and the closed position. Further, the actuator 220 may be configured to selectively slide the gate 810 along a sealing surface 222 of a neck 126. The neck 126 may comprise a wall 224 fixed perpendicular to the surface of the tank 104. As discussed above with regard to FIGS. 1A and 1B, the neck 126 may be coupled to the wall 124 of the tank 104 proximate to the lowest portion 120 of the slope 112 of the bottom surface 108 of the tank 104, and the sealing surface 222 may be arranged distal to an outside surface of the wall 124 of the tank 104. For example the wall 224 of the neck 126 may be fixed to the wall 124 of the tank 104 proximate to the lowest portion 120 of the slope 112 of the bottom surface 108 of the tank 104. The wall 224 of the neck 126 may have an outer edge (e.g., sealing surface 222) arranged around a perimeter of the wall 224 of the neck 126 and distal to the surface of the tank 104. The one or more locking members 812 may displace the gate 810 in the second linear direction 218 perpendicular to the sealing surface 222 to seal the gate to the sealing surface 222 of the neck 126 in the locked position.

The gate 810 may be arranged to selectively slide parallel to the sealing surface 222 of the neck 126 between the open position, the closed position, and/or the intermediate position between the open position and the closed position. The gate 810 may be slideably disposed in a first plane adjacent to a surface (e.g., wall 124) of the tank 104, and the gate 810 may slideably displace in the first plane along the surface of the tank 104 between an open position, a closed position, and/or an intermediate position between the open position and the closed position. The gate 810 may comprise a gasket 226 coupled to the gate 810 to seal the gate 810 to the sealing surface 222 of the neck 126 in the locked position. The gasket 226 may cover substantially the entire rear face of the gate 810 or only a portion of the rear face of the gate 810. The gasket 226 may comprise an elastomeric gasket, a paper gasket, metal gasket, a cork gasket, etc.

Front view 802 illustrates cams 824 and 826 connected to the one or more locking members 812 to rotatably displace the one or more locking members 812 between the locked position and the un-locked position. While front view 802 illustrates the actuator 220 connected with the cams 824 and 826, the manway gate assembly 808 may comprise manually operated cams. For example, one or more levers may be coupled to the cams 824 and 826 to operate the cams 824 and 826 to rotatably 812 the one or more locking members between the locked position and the un-locked position.

Perspective view 806 illustrates the cams 824 and 826 may be linked together via a rod 828. The rod 828 may be coupled to both the cams 824 and 826 such that cams 824 and 826 are displaced together. For example, the rod 828 may be coupled between the cams 824 and 826 such that when the linear actuator 220 selectively displaces the rod 828 in the first linear direction 210, the cams 824 and 826 are rotated in unison with each other. Further, when the rod 828 is displaced in the first linear direction 210 the cams 824 and 826 are selectively rotated about the longitudinal axes 814 of the locking members 812. The manway gate assembly 808 may include one or more bearing surfaces 830, and the rod 828 may bear on the bearing surfaces 830 when the rod 828 is displaced in the first linear direction 210. For example, when the rod 828 is selectively actuated in the first linear direction 210 to displace the gate to the closed position, the rod 828 may be slideably displaced along the bearing surfaces 830 in the first linear direction 210. As the rod 828 bears on the bearing surfaces 830 and slides in the first linear direction, the rod 828 selectively rotates the cams 824 and 826 about the longitudinal axes 814 of the one or more locking members 812. When the cams 824 and 826 are selectively rotated about the longitudinal axes 814 of the one or more locking members 812, the one or more locking members 812 rotate between the locked position and the un-locked position. In one example, when the cams 824 and 826 are selectively rotated about the longitudinal axes 814 of the one or more locking members 812, the one or more locking members 812 rotate the one or more cams 822 to bear on the one or more bearing surfaces 820 to apply a biasing force to the gate 810 perpendicular to the first and second planes to seal the gate 810 to a surface of a tank. The bearing surfaces 830 may comprise a bolt, a pin, a rolling pin, a smooth plate (e.g., a smooth nylon plate) arranged to cooperate with the rod 828.

The manway gate assembly 808 may include one or more stop surfaces 832, that when the rod 828 is selectively actuated in the first linear direction 210 to displace the gate to the open position, the rod 828 may bear on the stop surfaces 832. For example, when the rod 828 is selectively actuated in the first linear direction 210 to displace the gate to the open position, the rod 828 may be displaced on the bearing surfaces 830 as the gate is displaced in the first linear direction 210 to the open position. Stated otherwise, the stop surfaces 832 may stop the rod 828 from being displaced relative to the gate 810 to provide for raising the gate 810 to the open position. The stop surfaces 832 may comprise a bolt, a pin, a rolling pin, a smooth plate (e.g., a smooth nylon plate) arranged to come in contact with the rod 828.

Figure 9:
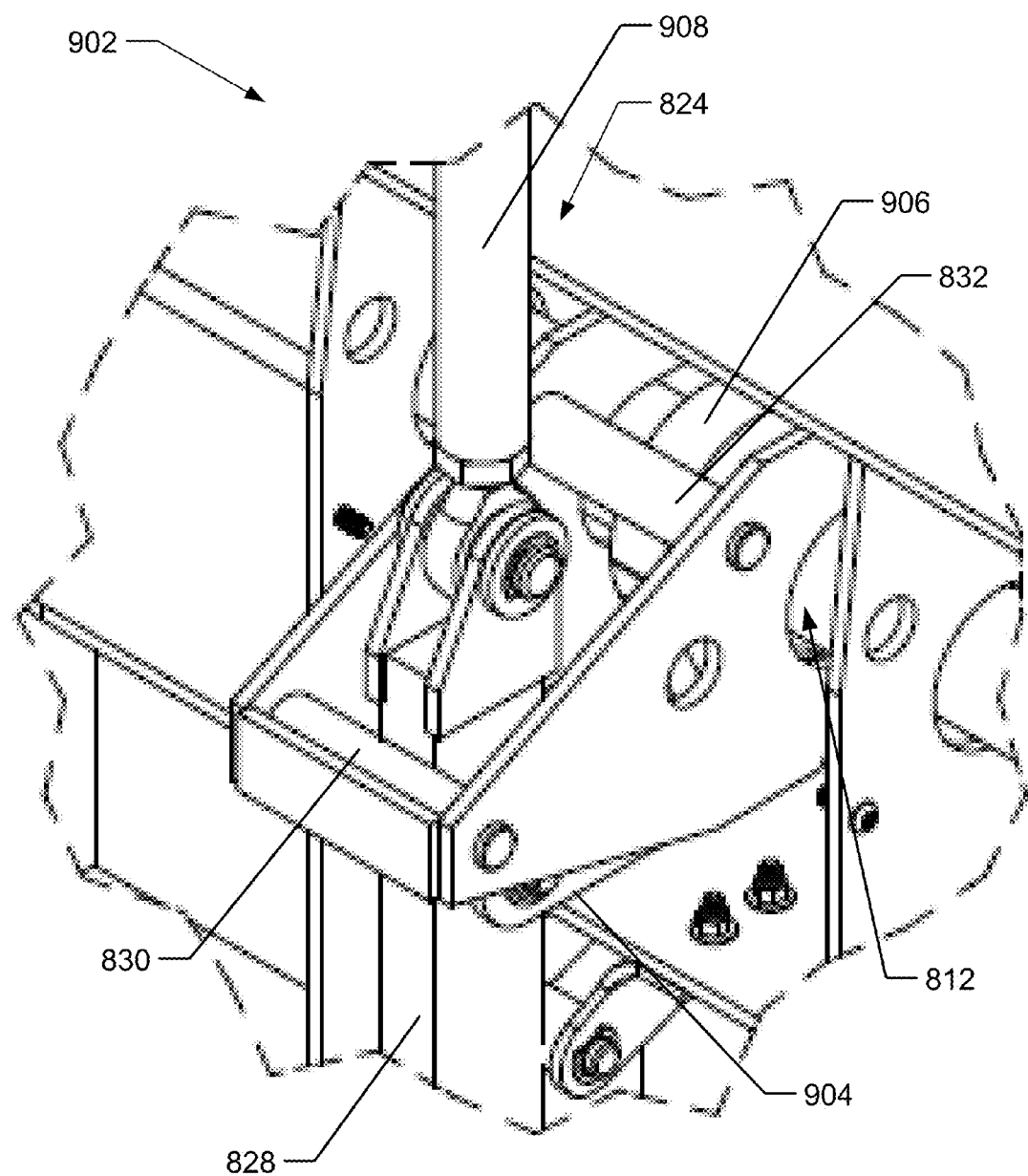
FIG. 9 illustrates a detail view of a rod connection of the example manway gate assembly shown in the perspective view of FIG. 8 taken at location F.

FIG. 9 illustrates a detail view 902 of the cam 824 of the example manway gate assembly 808 shown in the perspective view 806 of FIG. 8 taken at location F. FIG. 9 illustrates the rod 828 connected to a lever 904. The lever 904 may be pivotably connected to the rod 828 and the locking member 812. For example, one end of the lever 904 may be pivotably connected to the rod 828, and the other end of the lever 904 may be pivotably connected to a lobe 906. The lobe 906 may be irremovably or removably coupled to the locking member 812. In one example, the lobe 906 may comprise a clamping device. Thus, when the rod 828 is displaced via a rod 908 of the actuator 222 in the first linear direction 210, the cam lever 904 displaces (e.g., rotates) the lobe 906, and the lobe 906 displaces (e.g., rotates) the locking member 812. Cam 826 may be similar to cam 824. For example, the rod 828 may be connected to a lever, and the lever may be pivotably connected the locking member 812. For example, one end of the lever may be pivotably connected to the rod 828, and the other end of the lever may be pivotably connected to a lobe.

Figure 10:
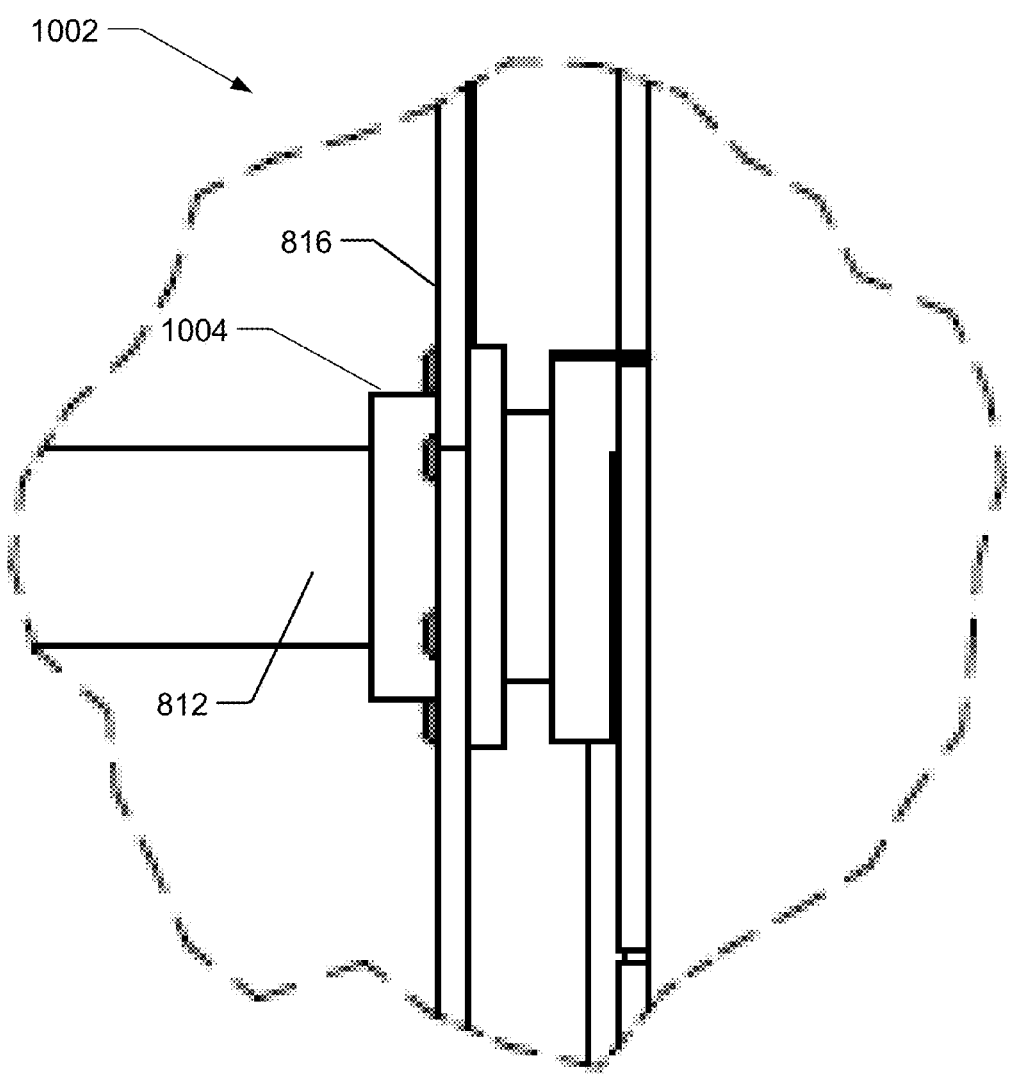
FIG. 10 illustrates a detail view of a locking member of the example manway gate assembly shown in the front view of FIG. 8 taken at location G.

FIG. 10 illustrates a detail view 1002 of the locking member 812 of the example manway gate assembly 808 shown in the front view of FIG. 8 taken at location G. FIG. 10 illustrates a bearing of one or more bearings 1004 arranged in the frame 816. The bearings 1004 may cooperate with the one or more locking members 812 to provide for displacing (e.g., rotating) the one or more locking members 812 about their longitudinal axes 814 between a locked position and an un-locked position.

Figure 11:
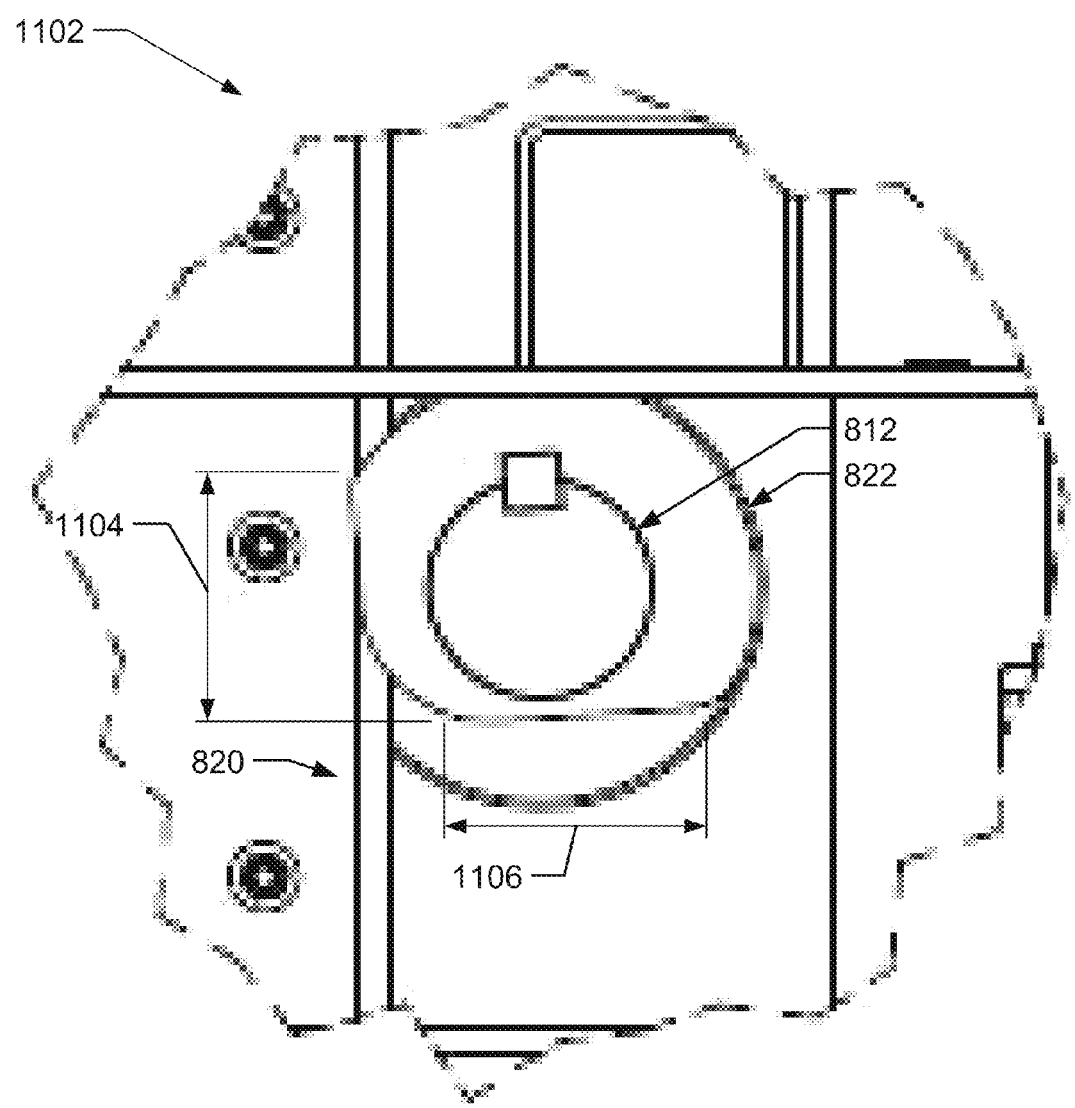
FIG. 11 illustrates a detail view of the locking member of the example manway gate assembly shown in the side view of FIG. 8 taken at location H.

FIG. 11 illustrates a detail view 1102 of the locking member 812 of the example manway gate assembly 808 shown in the side view of FIG. 8 taken at location H. FIG. 11 illustrates the cam 822 coupled to the locking member 812. As discussed above, the cam 822 may bear on the one or more bearing surfaces 820 to displace the gate 810 perpendicular to the first and second planes to seal the gate 810 to a surface of a tank. For example, the one or more cams 822 may comprise a lobe portion 1104 (e.g. round projection, protrusion, bump, etc.) arranged to bear on the bearing surface 820. For example, when the lobe portion 1104 is displaced (e.g., rotated) in a direction towards the bearing surface 820, the lobe portion 1104 may come in contact with, and bear on, the bearing surface 820 to apply a biasing force to the gate 810 in the second linear direction 218 to tightly press the gate 810 against a gasket (e.g., an elastomeric seal) thus creating a liquid tight seal. For example, one or more cams 822 of the one or more rotatable locking members 812 may bear on the one or more bearing surfaces 820 to apply a biasing force to the gate 810 in the direction 218 perpendicular to the sealing surface of the aperture to seal the gate 810 to the sealing surface of the aperture in the locked position. Further, the one or more cams 822 may comprise a planar portion 1106 arranged to not bear on (e.g., be free of contact with) the bearing surface 820. For example, when the planar portion 1106 is displaced (e.g., rotated) in a direction towards the bearing surface 820, the planar portion 1106 may be arranged parallel with, and be free of contact with the bearing surface 820 to provide for displacing the gate 810 in the first linear direction 210 between the open position, the closed position, and/or the intermediate position between the open position and the closed position.

Figure 12:
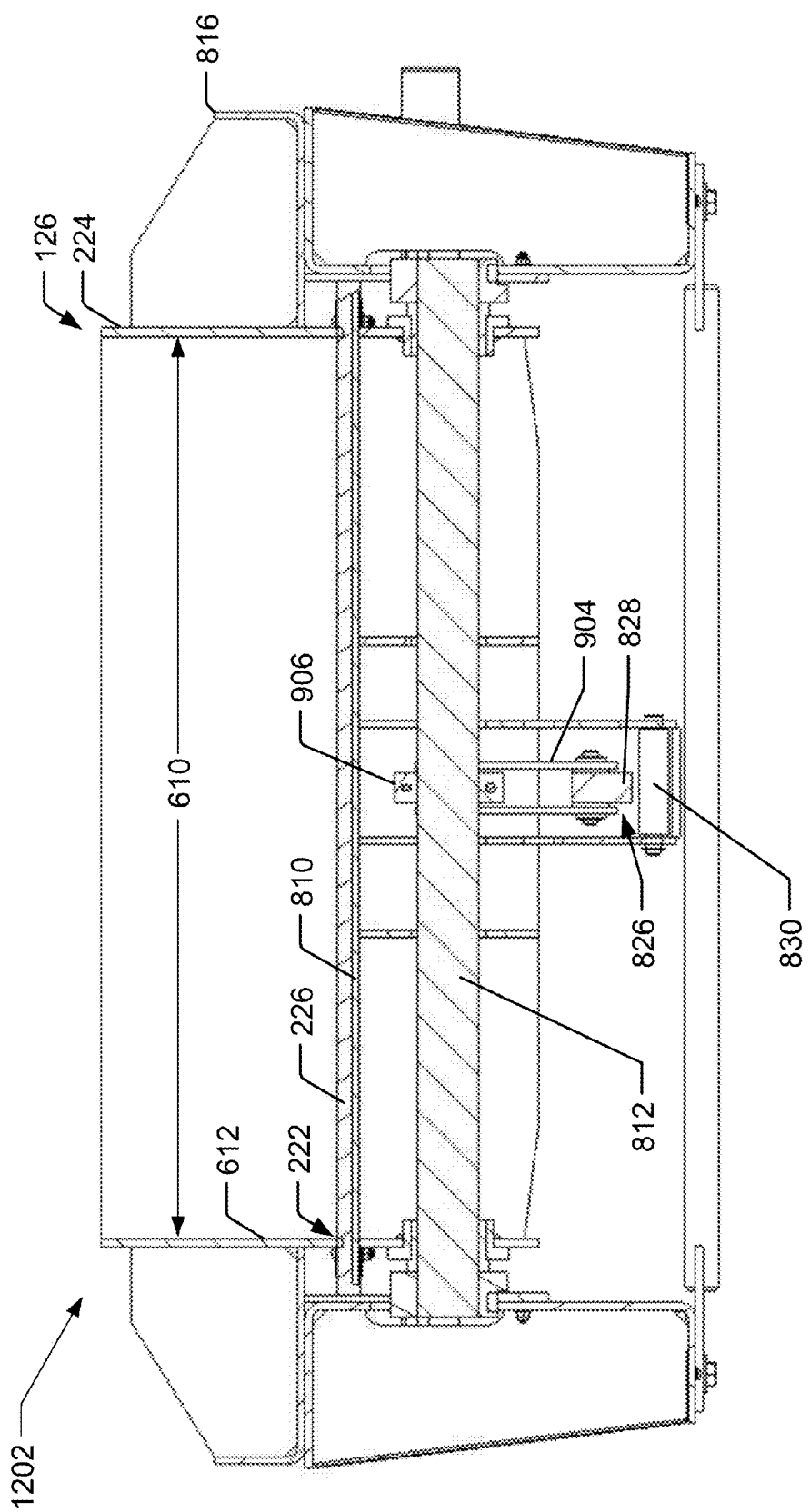
FIG. 12 illustrates a detail section view of the example manway gate assembly shown in the front view of FIG. 8 taken along line I-I.

FIG. 12 illustrates a detail section view 1202 of the example manway gate assembly 808 shown in the front view 802 of FIG. 8 taken along line I-I. Detail section view 1202 illustrates the manway gate assembly 808 comprising the passageway 610 having the substantially uniform planar surface 612 that provides for not impeding the flow of product emptying from the tank 104. The gate 810 may comprise the gasket 226 coupled to the gate 810 to seal the gate 810 to the sealing surface 222 of the neck 126 in the locked position.

Figure 13:
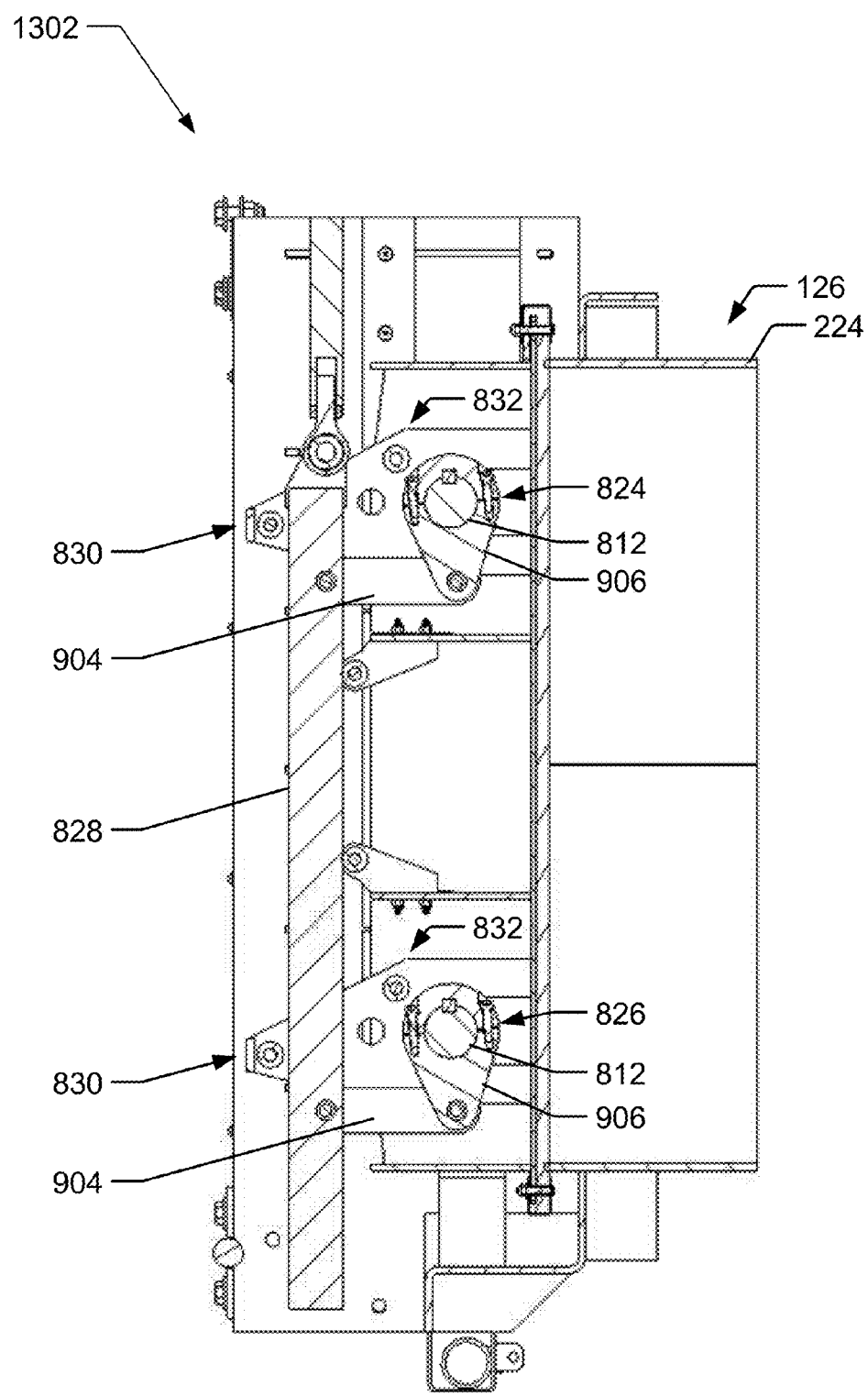
FIG. 13 illustrates a detail section view of the example manway gate assembly shown in the front view of FIG. 8 taken along line J-J.

FIG. 13 illustrates a detail section view 1302 of the example manway gate assembly 808 shown in the front view 802 of FIG. 8 taken along line J-J. Detail section view 1302 illustrates the cams 824 and 826 connected to the one or more locking members 812 to rotatably displace the one or more locking members 812 between the locked position and the un-locked position. Detail section view 1302 illustrates the ends of the levers 904 may be pivotably connected to the rods 828, and the other ends of the levers 904 may be pivotably connected to the lobes 906.

Example Method of Using a Manway Gate Assembly

Figure 14:
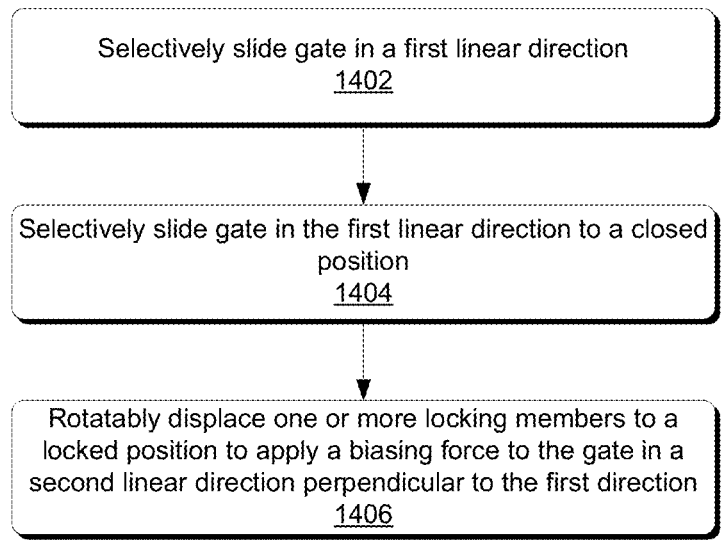
FIG. 14 is a flow diagram illustrating an example process of closing and locking a tank via the example manway gate assembly shown in FIG. 8.

FIG. 14 illustrates an example method 1400 of closing and locking a tank (e.g., tank 104) via an example manway gate assembly (e.g., manway gate assembly 808). For instance, this process may be performed to empty and/or clean a self-emptying or self-cleaning tank, which has a bottom surface (e.g., bottom surface 108) having a non-zero slope (e.g., non-zero slope 112), which provides for a more efficient removal of pomace in the bottom of the tank. While FIG. 14 illustrates a method of using an example manway gate assembly configured to provide a liquid tight seal for a fermentation tank, this method may apply to using the manway gate assembly with any type of container. For example, the manway gate assembly may be used with a mash tank, a petroleum tank, a milk tank, a septic tank, a gas tank, etc.

Method 1400 may include an operation 1402, which represents selectively sliding a gate (e.g., gate 810) in a first linear direction (e.g., first linear direction 210). For example, a user may selectively slide the gate in the first linear direction between an open position, a closed position, and/or an intermediate position between the open position and the closed position. A user may selectively slide the gate in the first linear direction between an open position, a closed position, and/or an intermediate position between the open position and the closed position to control a flow rate of product (e.g., pomace) emptying from the tank. The gate may be selectively moved between the open, closed, and/or an intermediate positions via an actuator (e.g., actuator 220). Method 1400 may proceed to operation 1404, which represents selectively sliding the gate in the first linear direction to the closed position. For example, subsequent to emptying and/or cleaning the product from the tank, a user may selectively close the gate to the closed position.

Method 1400 may be complete at operation 1406, which represents rotatably displacing one or more locking members (e.g., one or more locking members 812) to a locked position, where the one or more locking members apply a biasing force to the gate in a second linear direction (e.g., second linear direction 218) perpendicular to the first linear direction. For example, a user may selectively rotate the one or more locking members to apply a biasing force to the gate perpendicular to a first plane adjacent to a surface of the tank to tightly press the gate against a gasket (e.g., gasket 226) thus creating a liquid tight seal.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A container comprising:
a tank for holding a product; and
a gate assembly coupled to the tank, the gate assembly comprising:
a gate slideably disposed in a first plane adjacent to a surface of the tank, the gate to slideably displace in the first plane along the surface of the tank between an open position and a closed position; and
one or more locking members having a longitudinal axis movably disposed in a second plane parallel to the first plane, the one or more locking members being movable between a locked position and an un-locked position, and the one or more locking members comprising one or more cams, the one or more cams including a lobe portion,
wherein the lobe portion of the one or more cams applies a biasing force to the gate in a direction perpendicular to the first and second planes to seal the gate to the surface of the tank in the locked position.

2. The container of claim 1, wherein the gate comprises a planar rectangular shaped plate.

3. The container of claim 1, wherein the one or more locking members are rotatable in the second plane parallel to the first plane between the locked position and the un-locked position.

4. The container of claim 3, wherein the gate assembly further comprises a frame arranged around the gate, the frame comprising one or more bearing surfaces, and the lobe portion of the one or more cams to bear on the one or more bearing surfaces to apply a biasing force to the gate perpendicular to the first and second planes to seal the gate to the surface of the tank in the locked position.

5. The container of claim 4, wherein the gate assembly further comprises:
a linear actuator coupled to the frame and to the gate, the linear actuator to selectively slide the gate between the open position, the closed position, or an intermediate position between the open position and the closed position.

6. The container of claim 3, wherein the gate assembly further comprises:
a rod connected to the one or more locking members to rotate the one or more locking members between the locked position and the un-locked position.

7. The container of claim 6, wherein the gate assembly further comprises:
an actuator connected with the rod connected to the one or more locking members to rotate the one or more locking members between the locked position and the un-locked position.

8. The container of claim 1, further comprising a scraper blade assembly rotatably coupled to a bottom surface of the container to displace solids deposited on the bottom surface of the container through the gate assembly when the gate is in the open position or an intermediate position between the open position and the closed position.

9. The container of claim 1, wherein the gate is movable in the first plane along the surface of the tank to an intermediate position between the open position and the closed position.

10. The container of claim 1, wherein the container comprises a fermentation tank.

11. A tank comprising:
a top surface;
a bottom surface opposite the top surface, the bottom surface having a non-zero slope relative to a horizontal support surface;
a wall coupled to and between the bottom surface and the top surface;
an aperture arranged in the wall of the tank proximate to the lowest portion of the slope of the bottom surface of the tank, the aperture comprising a sealing surface; and a manway gate assembly arranged around the aperture through which to empty a product held in the tank, the manway gate assembly comprising:
- a gate arranged adjacent to the sealing surface of the aperture, the gate to selectively slide along the sealing surface of the aperture between an open position and a closed position; and
- one or more locking members rotatably disposed adjacent to the gate, each of the one or more rotatable locking members to rotate about a longitudinal axis of the respective one or more rotatable locking member between a locked position and an un-locked position, and the one or more rotatable locking members comprising one or more cams, the one or more cams including a lobe portion,
- wherein the lobe portion of the one or more cams applies a biasing force to the gate in a direction perpendicular to the sealing surface of the aperture to seal the gate to the sealing surface of the aperture in the locked position.

12. The tank of claim 11, wherein the manway gate assembly further comprises a frame arranged around the gate, the frame comprising one or more bearing surfaces, and
wherein the lobe portion of the or more cams to bear on the one or more bearing surfaces to apply a biasing force to the gate in the direction perpendicular to the sealing surface of the aperture to seal the gate to the sealing surface of the aperture in the locked position.

13. The tank of claim 11, wherein the manway gate assembly further comprises:
a linear actuator coupled to the frame and to the gate, the linear actuator to selectively slide the gate between the open position, the closed position, or an intermediate position between the open position and the closed position.

14. The tank of claim 11, wherein the manway gate assembly further comprises a rod connected to the one or more locking members to rotate the one or more rotatable locking members between the locked position and the un-locked position.

15. The tank of claim 11, further comprising a blade rotatably coupled to the bottom surface of the tank to displace solids deposited on the bottom surface of the tank through the gate when the gate is in the open position or an intermediate position between the open position and the closed position.

16. A manway sliding gate assembly comprising:
a gate to selectively slide in a first linear direction between an open position and a closed position; and
one or more locking members movably arranged adjacent to the gate, the one or more locking members being movable between a locked position and an un-locked position, and the one or more locking members comprising one or more cams, the one or more cams including a lobe portion,
wherein in the locked position the lobe portion of the one or more cams applies a biasing force to the gate in a second linear direction perpendicular to the first linear direction.

17. The manway sliding gate assembly of claim 16, wherein each of the one or more locking members is rotatable about a longitudinal axis of the respective one or more locking members between the locked position and the un-locked position.

18. The manway sliding gate assembly of claim 17, wherein the manway gate assembly further comprises a frame arranged around the gate, the frame comprising one or more bearing surfaces, and the lobe portion of the one or more cams to bear on the one or more bearing surfaces to apply a biasing force to the gate in the second linear direction perpendicular to the first linear direction.

19. The manway sliding gate assembly of claim 18, wherein the manway gate assembly further comprises:
a rod connected to the one or more locking members to rotate the one or more locking members between the locked position and the un-locked position.

20. The manway sliding gate assembly of claim 19, wherein the manway gate assembly further comprises:
an actuator connected with the rod connected to the one or more locking members to rotate the one or more locking members between the locked position and the un-locked position.

* * * * *